(12) United States Patent
Ma et al.

(10) Patent No.: US 7,941,117 B2
(45) Date of Patent: May 10, 2011

(54) DIGITAL APPROACH FOR IMAGE REJECTION CORRECTION IN LOW INTERMEDIATE FREQUENCY CONVERSION TUNER

(75) Inventors: Jun Ma, Irvine, CA (US); Ahmed Eltawil, Irvine, CA (US); Xiaoyu Fu, Irvine, CA (US)

(73) Assignee: Newport Media, Inc., Lake Forest, CA (US)

( * ) Notice: Subject to any disclaimer, the term of this patent is extended or adjusted under 35 U.S.C. 154(b) by 673 days.

(21) Appl. No.: 12/039,806

(22) Filed: Feb. 29, 2008

(65) Prior Publication Data

US 2009/0221255 A1   Sep. 3, 2009

(51) Int. Cl.
  *H04B 1/10* (2006.01)
(52) U.S. Cl. .......................... 455/285; 455/296; 455/302
(58) Field of Classification Search .................. 455/285, 455/278.1, 296, 63.1, 302; 375/296, 346, 375/144, 148, 348
  See application file for complete search history.

(56) References Cited

U.S. PATENT DOCUMENTS

| 4,003,054 | A * | 1/1977 | Goldstone | 342/174 |
| 6,993,091 | B2 * | 1/2006 | Ratto | 375/297 |
| 7,298,793 | B2 * | 11/2007 | Wu et al. | 375/296 |
| 7,376,170 | B2 * | 5/2008 | Scheck | 375/130 |
| 7,570,710 | B1 * | 8/2009 | Fortier et al. | 375/297 |
| 2005/0041754 | A1 * | 2/2005 | Wu et al. | 375/295 |
| 2006/0281429 | A1 * | 12/2006 | Kishi et al. | 455/313 |

* cited by examiner

*Primary Examiner* — Sonny Trinh
(74) *Attorney, Agent, or Firm* — Rahman LLC (57) ABSTRACT

A method of processing an in-phase signal component and a quadrature signal component of a low intermediate frequency (LIF) signal includes estimating and correcting an amplitude imbalance between a digitized in-phase signal component and a digitized quadrature signal component at a first point in time, and estimating and correcting a phase imbalance between the digitized in-phase signal component and the digitized quadrature signal component at a second point in time in response to the correcting process. The digitized in-phase signal component corresponds to the in-phase signal component at the first point in time and the digitized quadrature signal component corresponds to the quadrature signal component at the first point in time. The second point in the time is subsequent to the first point in time.

20 Claims, 6 Drawing Sheets

DIGITAL APPROACH FOR IMAGE REJECTION CORRECTION IN LOW INTERMEDIATE FREQUENCY CONVERSION TUNER

BACKGROUND

1. Technical Field

The embodiments herein generally relate to electrical circuits, and, more particularly, to a digital approach for image rejection correction in low intermediate frequency conversion tuners.

2. Description of the Related Art

A local oscillator (LO) is a device used to generate a signal which is combined with a signal of interest to mix the signal to a different frequency. The LO produces a signal which is injected into the mixer along with the signal from the antenna. This effectively changes the antenna signal by heterodyning with it to produce the sum and difference (e.g., with the utilization of trigonometric angle sum and difference identities) of that signal one of which will be at the intermediate frequency (IF) which can be handled by an IF amplifier. Image rejection (IR) is a measure of a receiver's ability to reject signals at its image frequency. IR is normally expressed as the ratio, in dB, of the receiver's sensitivity at the desired frequency to the sensitivity at the image frequency. A distortion component signal is calculated based on the difference between the current detection signal and the audio signal.

In a low intermediate frequency (LIF) conversion tuner, a desired signal in the radio frequency (RF) is down converted to a LIF signal through the LO, which consists of an in-phase component and a quadrature component. In reality, amplitude and phase of the in-phase component and the quadrature component are usually not balanced. This leads to a leakage of the alternative channel into the desired signal channel band, which is usually referred as image leakage. The image leakage component is a distortion to the desired signal, and its strength depends on the magnitude of the amplitude and the phase imbalance offsets during the LIF down conversion. It is desirable to cancel or remove the image component due to the amplitude and the phase imbalances to improve the received signal quality. The process is usually referred as IR correction.

Figure 1:
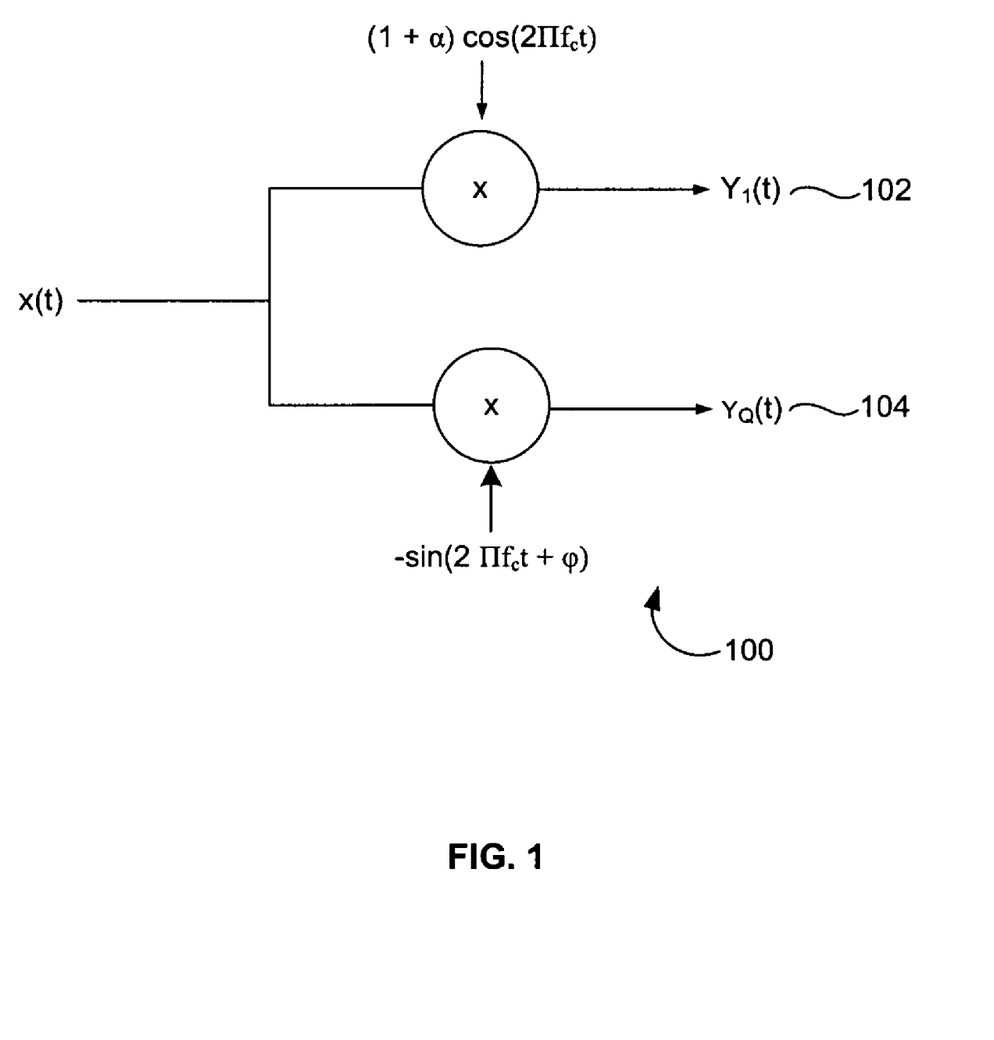
FIG. 1 is a mathematical flow diagram showing a LIF down conversion model of a mixer.

FIG. 1 is a mathematical flow diagram of a low intermediate frequency down conversion mixer 100. FIG. 1 illustrates how in-phase and quadrature component mismatches are introduced in a quadrature mixer 100, which includes both a phase mismatch and a gain mismatch. For clarity, the gain mismatch $(1+\alpha)$ is put into the in-phase path (cosine), and the phase mismatch $(\phi)$ is put into the quadrature path (sine). Within the mixer 100, a received signal $x(t)$ is mixed at nodes 102, 104 with two signals at a predetermined frequency provided from a quadrature generator (not shown). The received RF signal $x(t)$ is mixed with a LO cosine function to generate $y_I(t)$ and with the LO sine function to generate $y_Q(t)$. A complex IF signal output from the mixer 100 can be expressed as $y(t)=y_I(t)+i \cdot y_Q(t)$. After some mathematical manipulation, $y(t)$ can be expressed as:

$$y(t) = y_I(t) + i \cdot y_Q(t) \qquad (1)$$
$$= [(1+\alpha)\cos(2\pi f_c t) - i \cdot \sin(2\pi f_c t + \varphi)] \cdot x(t)$$
$$= G \cdot (e^{-i \cdot 2\pi f_c t} + I \cdot e^{i \cdot 2\pi f_c t}) \cdot x(t)$$

where,

-continued
$$G = \frac{1}{2}(1 + \alpha + e^{-i\cdot\varphi}), \quad I = \frac{1+\alpha-e^{i\cdot\varphi}}{1+\alpha+e^{-i\cdot\varphi}} 0 \qquad (2)$$

If $\alpha \neq 0$, there will be amplitude imbalance, and it $\phi \neq 0$, there will be phase imbalance. However in practical analog receivers, there is usually some mismatch, which results in image leakage through the quadrature mixer 100.

Figure 2:
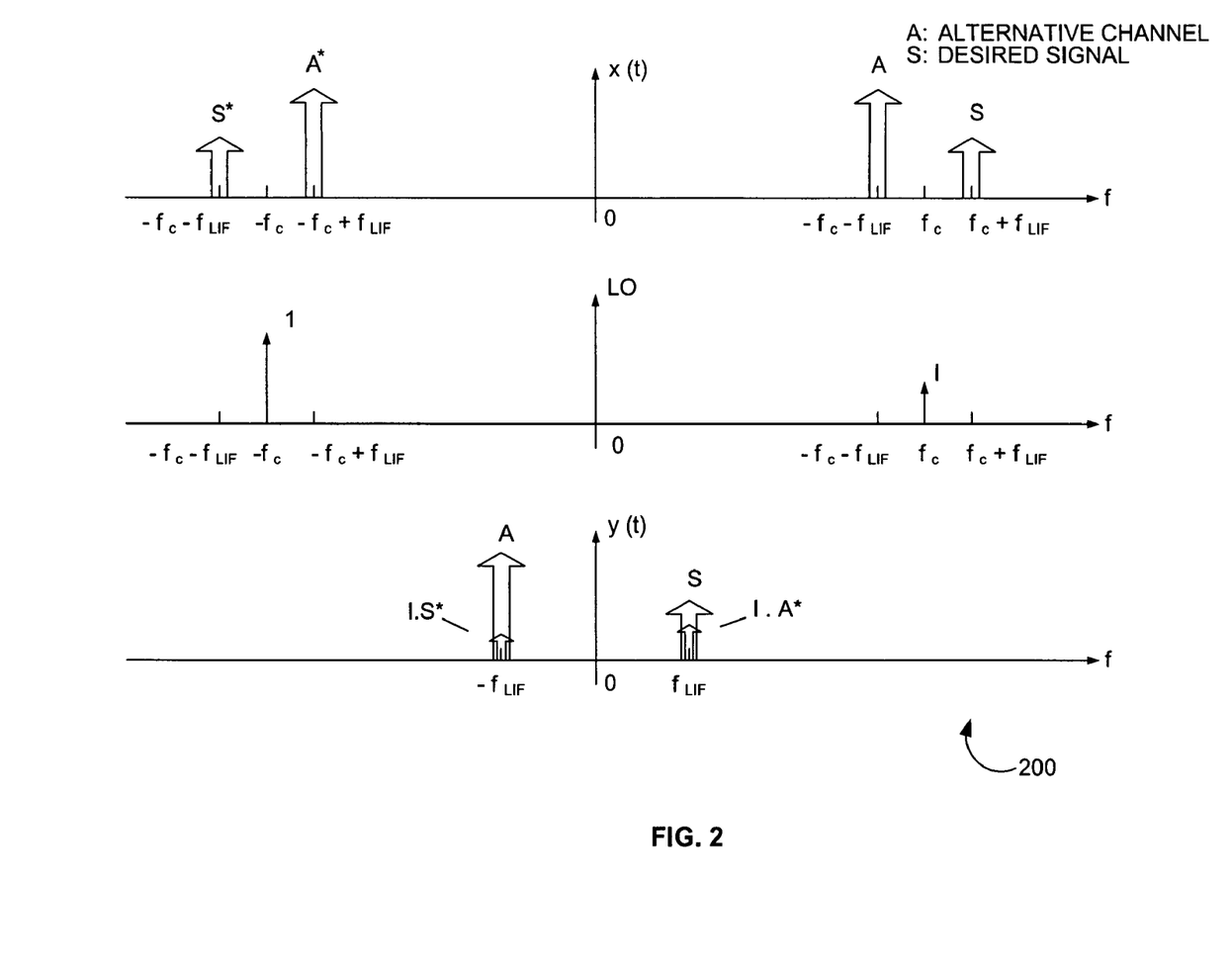
FIG. 2 is a graphical diagram showing a image rejection problem.

FIG. 2 is a graphical diagram 200 showing an IR problem. FIG. 2 illustrates the spectral distribution of an exemplary combination of signals in image leakage. At the input, a desired signal, whose complex baseband representation is S, is present at a frequency $f_c+f_{LIF}$, while an alternative channel, whose complex baseband representation is A, is present at the image frequency of S, $f_c-f_{LIF}$. Signal A represents a signal in a different channel than signal S and has a larger magnitude than signal S. In the illustrated example, signal A is two channels removed from signal S and is referred to as an alternate channel signal relative to signal S. As signals S and A are complex, conjugate signal versions S* and A* exist in the negative frequency plane at frequencies $-(f_c+f_{LIF})$, and $-(f_c-f_{LIF})$, respectively. The amount of image leakage into the desired band is proportional to the magnitude of the interference components I due to the amplitude and phase imbalance offsets.

Traditionally, a combined analog and digital approach is employed to achieve the IR corrections. In these approaches, a training signal is usually required from the analog domain. Interactions between the analog and the digital domain make these types of approaches not very attractive, and the IR performance is also limited to certain degree.

SUMMARY

In view of the foregoing, an embodiment herein provides a method of processing an in-phase signal component and a quadrature signal component of a LIF signal, and includes estimating and correcting an amplitude imbalance between a digitized in-phase signal component and a digitized quadrature signal component at a first point in time, and estimating and correcting a phase imbalance between the digitized in-phase signal component and the digitized quadrature signal component at a second point in time in response to the correcting process. The digitized in-phase signal component corresponds to the in-phase signal component at the first point in time and the digitized quadrature signal component corresponds to the quadrature signal component at the first point in time. The second point in the time subsequent to the first point in time.

The correcting of the amplitude imbalance includes determining an amplitude offset between the digitized in-phase signal component at the first point in time and the digitized quadrature signal component at the first point in time. The amplitude imbalance is determined as a function of at least one of a variance of the in-phase signal component and a variance of the quadrature signal component. The amplitude imbalance is determined in accordance with equation:

$$\alpha = \sqrt{\frac{\text{Var}(y_I)}{\text{Var}(y_Q)}} - 1,$$

denotes the amplitude imbalance, Var denotes variance, $y_I$ denotes the in-phase component of a complex IF signal output, and $y_Q$ denotes the quadrature component of the complex IF signal output.

The phase offset is determined as a function of at least one of an expected value of the digitized in-phase signal component at the second point in time, an expected value of the digitized quadrature signal component at the second point in time, and an expected value of an input signal at the second point in time. The phase offset is determined in accordance with equation:

$$\varphi = -\frac{2E(y_I \cdot y_Q)}{E(x^2(t))},$$

φ denotes a phase imbalance, E denotes the expectation function, $y_I$ denotes the in-phase component of a complex IF signal output, and $y_Q$ denotes the quadrature component of the complex IF signal output. A phase offset is corrected between the digitized in-phase signal component and the digitized quadrature signal component at a third point in time in response to the estimating the phase offset, the third point in time is subsequent to the second point in time.

In another aspect, a method of processing an in-phase signal component and a quadrature signal component of a LIF signal includes correcting an amplitude imbalance between a digitized in-phase signal component and a digitized quadrature signal component at a first point in time, estimating a phase imbalance between the digitized in-phase signal component and the digitized quadrature signal component at a second point in time in response to the correcting, and correcting the phase imbalance between the digitized in-phase signal component and the digitized quadrature signal component at a third point in time in response to the estimating of the phase imbalance. The digitized in-phase signal component corresponds to the in-phase signal component at the first point in time and the digitized quadrature signal component corresponds to the quadrature signal component at the first point in time. The correcting of the amplitude imbalance includes calculating the amplitude offset between the digitized in-phase signal component at the first point in time and the digitized quadrature signal component at the first point in time. The second point in time the subsequent to the first point in time and the third point in time is the subsequent to the second point in time.

The amplitude imbalance is determined as a function of at least one of a variance of the in-phase signal component and a variance of the quadrature signal component. The amplitude imbalance is determined in accordance with equation:

$$\alpha = \sqrt{\frac{\mathrm{Var}(y_I)}{\mathrm{Var}(y_Q)}} - 1,$$

α denotes the amplitude imbalance, Var denotes variance, $y_I$ denotes the in-phase component of a complex IF signal output, and $y_Q$ denotes the quadrature component of the complex IF signal output. The phase imbalance is determined as a function of at least one of an expected value of the digitized in-phase signal component at the second point in time, an expected value of the digitized quadrature signal component at the second point in time, and an expected value of an input signal at the second point in time. The phase imbalance is estimated in accordance with equation:

$$\varphi = -\frac{2E(y_I \cdot y_Q)}{E(x^2(t))},$$

φ denotes a phase imbalance, E denotes the expectation function, $y_I$ denotes the in-phase component of a complex IF signal output, and $y_Q$ denotes the quadrature component of the complex IF signal output.

In yet another aspect, a receiver circuit includes an IQ mixer configured to provide a signal having in-phase (I) and quadrature (Q) components, a plurality of cycle counters operatively connected to the IQ mixer, at least one loop gain unit operatively connected to the plurality of cycle counters, the loop gain unit having at least one predefined threshold, and at least one round/clip component operatively connected to the at least one loop gain unit and adapted to remove an undesired signal and to correct a digitized in-phase signal component and a digitized quadrature signal component of the signal at a first point in time. The in-phase and quadrature components include at least one of an input and an output signal.

The digitized in-phase signal component corresponds to the in-phase signal component at the first point in time and the digitized quadrature signal component corresponds to the quadrature signal component at the first point in time, and a phase imbalance between the digitized in-phase signal component and the digitized quadrature signal component at a second point in time in response to the correct digitized in-phase signal component and a digitized quadrature signal component of the signal. The second point in time is subsequent to the first point in time.

The cycle counters are adapted to determine the number of times the signal has a phase imbalance and an amplitude imbalance. The predefined threshold is at least one of a 1 and 0. The amplitude imbalance is determined as a function of at least one of a variance of the in-phase signal component and a variance of the quadrature signal component. The IQ mixer is adapted to mix the in phase and the quadrature components. The phase imbalance is corrected based on a phase imbalance offset estimation. The amplitude imbalance is determined in accordance with equation:

$$\alpha = \sqrt{\frac{\mathrm{Var}(y_I)}{\mathrm{Var}(y_Q)}} - 1,$$

α denotes the amplitude imbalance, Var denotes variance, $y_I$ denotes the in-phase component of a complex IF signal output, and $y_Q$ denotes the quadrature component of the complex IF signal output.

The phase offset is determined as a function of at least one of an expected value of the digitized in-phase signal component at the second point in time, an expected value of the digitized quadrature signal component at the second point in time, and an expected value of an input signal at the second point in time, and the phase imbalance is estimated in accordance with equation:

$$\varphi = -\frac{2E(y_I \cdot y_Q)}{E(x^2(t))},$$

φ denotes a phase imbalance, E denotes the expectation function, $y_I$ denotes the in-phase component of a complex IF signal output, and $y_Q$ denotes the quadrature component of the complex IF signal output.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a method of processing an in-phase signal component and a quadrature signal component of a LIF signal, and includes estimating and correcting an amplitude imbalance between a digitized in-phase signal component and a digitized quadrature signal component at a first point in time, and estimating and correcting a phase imbalance between the digitized in-phase signal component and the digitized quadrature signal component at a second point in time in response to the correcting process. Referring now to the drawings, and more particularly to FIGS. 3 through 6, where similar reference characters denote corresponding features consistently throughout the figures, there are shown preferred embodiments.

Figure 3:
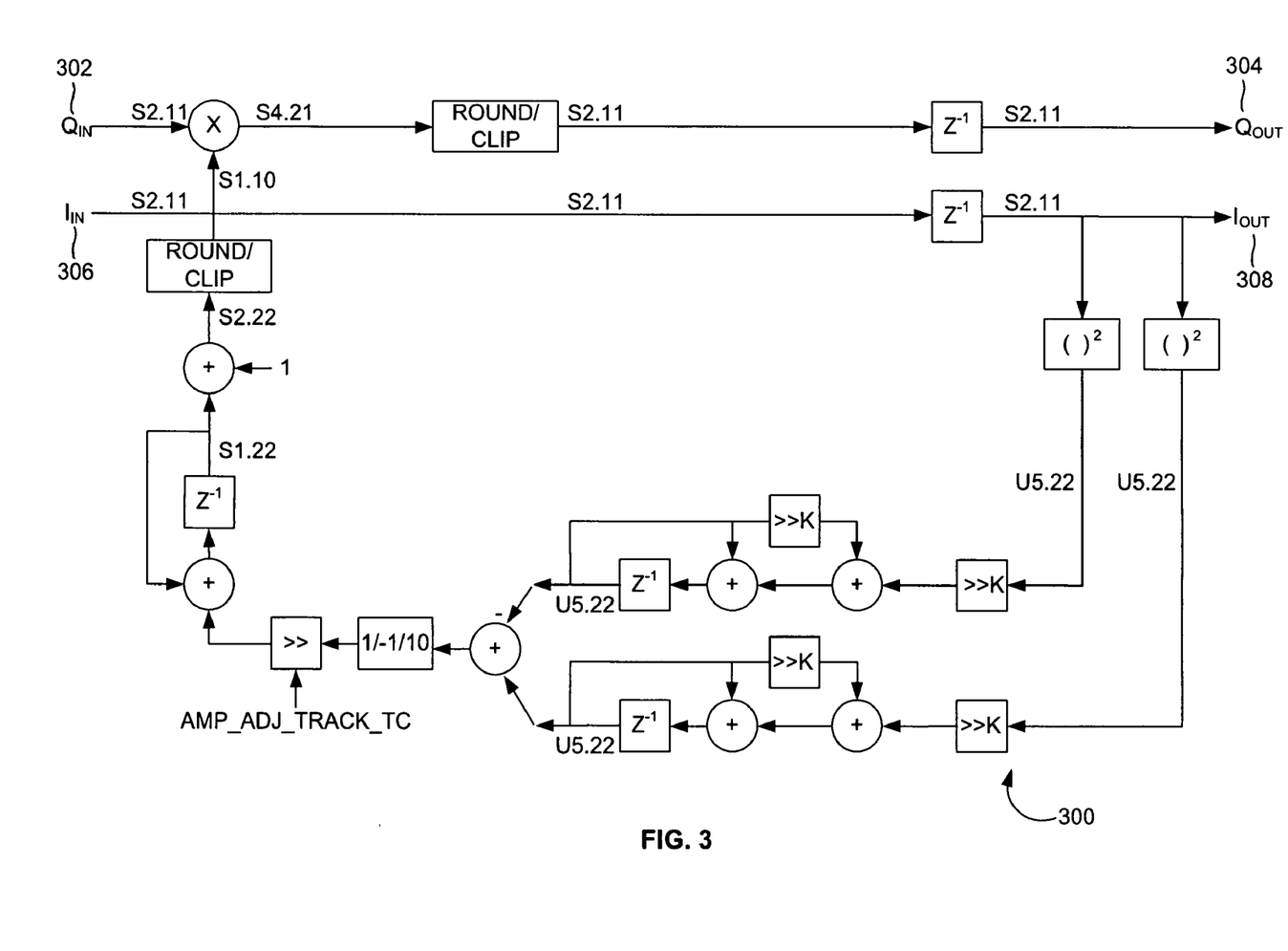
FIG. 3 illustrates a schematic diagram of a very-large scale integration (VLSI) architecture for amplitude imbalance offset estimation and correction according to an embodiment herein.
Figure 4:
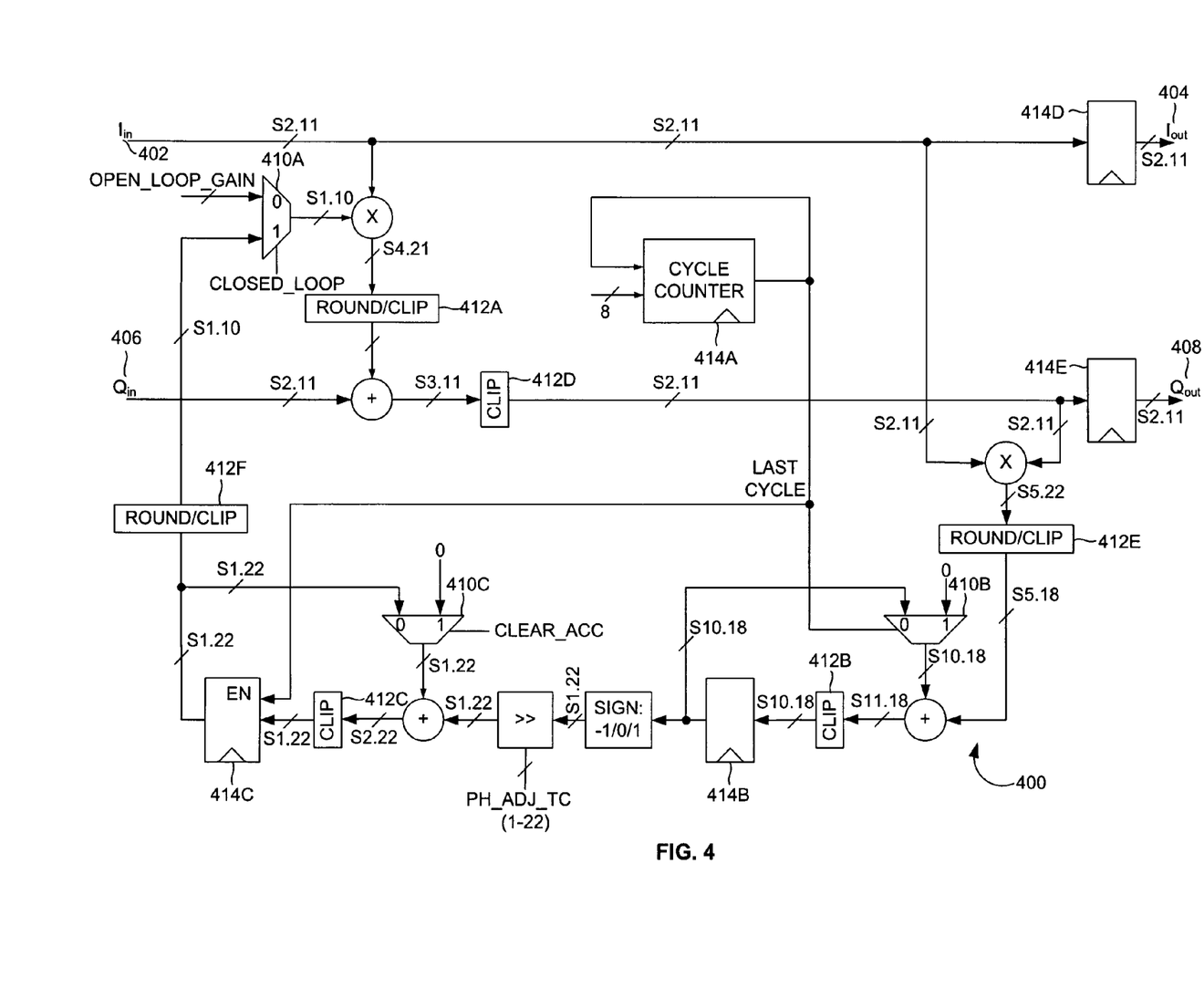
FIG. 4 illustrates a schematic diagram of a detailed architecture based on phase lock loop according to an embodiment herein.

FIG. 3 illustrates a schematic diagram of VLSI architecture 300 for amplitude imbalance offset estimation and correction according to an embodiment herein. The VLSI architecture 300 includes a quadrature input ($Q_{in}$) 302, a quadrature output ($Q_{out}$) 304, an in-phase input ($I_{in}$) 306 and an in-phase output ($I_{out}$) 308. The functions performed by the circuits are mathematically described in equations (4)-(6). The "S" and "U" notations in FIGS. 3 and 4 refer to a signed number and an unsigned number, respectively. For example, notation S2.11 may denote a 14 bit signed number with a sign bit, 2 integer bits, and 11 fraction bits. Notation U5.2 may denote a 7 bit unsigned number with 5 integer bits and 2 fraction bits. $Q_{in}$ 302 and $I_{in}$ 306 data may be first squared and then fed into a moving average circuit. The moving average circuits may implement a leaky integrator architecture, i.e., $$y(n) = (1-2^{-k})y(n-1) + 2^{-k}x(n) \tag{3}$$

where x(n) is the input signal right after the square $(.)^2$ operation denoted by U5.22 format, y(n−1) is the output signal right after the $Z^{-1}$ delay element denoted by U5.22 format. Parameter k controls moving average memory length or leaky integrator leaking speed. The larger the value of k, the longer the moving average memory length or the slower the leaking speed. The square averaged data from I and Q rails may be then compared and the sign value is taken to feed into a numerical controlled oscillator (NCO) including a delay element $Z^{-1}$. The NCO output denoted by the S1.22 format is equal to the α value in equation (4). The NCO output may be added by "1" and then multiplied by $Q_{in}$ 302 to correct the amplitude imbalance between the I and Q rails.

FIG. 4 illustrates a schematic diagram of a VLSI architecture 400 for phase imbalance offset estimation and correction according to an embodiment herein. The VLSI architecture 400 includes an in-phase input ($I_{in}$) 402, an in-phase output ($I_{out}$) 404, a quadrature input ($Q_{in}$) 406, a quadrature output ($Q_{out}$) 408, a plurality of loop gain units 410(A-C), a plurality of round/clips 412(A-F), a plurality of cycle counters 414(A-E). The in-phase input ($I_{in}$) 402 and the quadrature input ($Q_{in}$) 406 are fed as an input signals. The plurality of loop gain units 410(A-C) includes predefined thresholds (e.g., 1 and 0). An open loop gain and a closed loop gain are fed as an input and are compared with the thresholds. The plurality of round/clips 412(A-F) clips and/or round offs the unwanted signal in order to correct a digitized in-phase signal component (I) and a digitized quadrature signal component (Q) at a first point in time.

The digitized in-phase signal component (I) may correspond to the in-phase signal component at the first point in time and the digitized quadrature signal component (Q) may correspond to the quadrature signal component at the first point in time, and a phase imbalance between the digitized in-phase signal component and the digitized quadrature signal component at a second point in time in response to the correction. The second point in time is subsequent to the first point in time. The cycle counters 414(A-E) each have two inputs. One is the accelerated control signal and the other input signal is the output of the cycle counter 414A and from the loop gain unit 410C which are given as a feedback. The plurality of cycle counters 414(A-E) determines the number of times the signal has the phase imbalance and the amplitude imbalance.

The sign blocks may take the sign of the input data which can take the values of −1 if the input is negative, 0 if the input is zero, or +1 if the input if positive. Parameter notation S1.22 may denote a 14 bit signed number with a sign bit, 2 integer bits, and 11 fraction bits. The functions performed by the circuits in FIG. 4 are mathematically described equations (7)-(10) and equation (14). The $I_{in}$, $Q_{in}$, and $I_{out}$, $Q_{out}$ are swapped in equation (14) which does not affect the functionality due to the symmetry property of the I and Q rails. The $I_{out}$ and $Q_{out}$ are obtained through $I_{in}$ and $Q_{in}$ via equation: $y(n) = (1-2^{-k})y(n-1) + 2^{-k}x(n)$, the I rail and Q rail are swapped in equation (14). The estimated phase imbalance value which is at the output of instance 412F, is obtained in the following way. The $I_{out}$ and $Q_{out}$ before the delay instance 414D and 414E may be first multiplied and round/clipped to generate a signal instance according to equations (7) and (8).

The input signal instance may be then fed into a simple average loop comprised of instances 414C, 412C and 410C according to equation (9). The sign of the out signal may be taken and scaled by PH_ADJ_TC (1-22), which determines the feedback loop tracking speed, and fed into a NCO comprised of instances 414B, 412B, 410B. The output may be round/clipped to generate the estimated phase imbalance value at the output of instance 412F. The mux instance 410A may be used to allow external manual control the phase imbalance value.

With reference to FIGS. 3 and 4, to correct the amplitude and phase imbalance and remove image leakage, the amplitude and phase offsets are first estimated and then corrected using a feedback loop. The amplitude offset is first corrected and then the phase offset is corrected.

To estimate the amplitude imbalance according to FIG. 1:

$$y_I = x(t) \cdot (1+\alpha)\cos(2\pi f_c t)$$

$$y_Q = -x(t) \cdot \sin(2\pi f_c t + \phi) \quad (4)$$

If variance is taken on both sides of equation (4), $$\mathrm{Var}(y_I) = \mathrm{Var}(x(t)) \cdot (1+\alpha)^2 \cdot \frac{1}{2} \quad (5)$$

$$\mathrm{Var}(y_Q) = \mathrm{Var}(x(t)) \cdot \frac{1}{2}$$

Thus the amplitude offset can be obtained as:

$$\alpha = \sqrt{\frac{\mathrm{Var}(y_I)}{\mathrm{Var}(y_Q)}} - 1 \quad (6)$$

To estimate the phase offset, from equation (4):

$$y_I \cdot y_Q = -x^2(t) \cdot (1+\alpha)\sin(2\pi f_c t + \phi)\cos(2\pi f_c t) \quad (7)$$

If amplitude offset has been assumed to be corrected in the first place; i.e. $\alpha=0$, then equation (7) becomes:

$$y_I \cdot y_Q = -\frac{1}{2} \cdot x^2(t) \cdot [\sin(4\pi f_c t + \varphi) + \sin\varphi] \quad (8)$$

If the expectation is taken on both side of equation (8):

$$E(y_I \cdot y_Q) = -\frac{1}{2} \cdot E(x^2(t))\sin\varphi \quad (9)$$

If the phase offset is assumed to be small; i.e., $\sin\phi \approx \phi$, the phase imbalance offset can be obtained as:

$$\varphi = -\frac{2E(y_I \cdot y_Q)}{E(x^2(t))} \quad (10)$$

According to one embodiment, after obtaining the amplitude imbalance offset estimation according to equation:

$$\alpha = \sqrt{\frac{\mathrm{Var}(y_I)}{\mathrm{Var}(y_Q)}} - 1,$$

the amplitude correction can be applied according to equation:

$$y_I = x(t) \cdot (1+\alpha)\cos(2\pi f_c t)$$

$$y_Q = -x(t) \cdot \sin(2\pi f_c t + \phi).$$

In practice, a phase locked loop based architecture is used to achieve the above parameter. After correcting the amplitude imbalance, the phase imbalance can be corrected based on the phase imbalance offset estimation given in equation:

$$\varphi = -\frac{2E(y_I \cdot y_Q)}{E(x^2(t))}.$$

According to the equation:

$$y_I = x(t) \cdot (1+\alpha)\cos(2\pi f_c t),$$

$$y_Q = -x(t) \cdot \sin(2\pi f_c t + \phi)$$

$$y_Q = -x(t) \cdot [\sin(2\pi f_c t)\cos\phi + \cos(2\pi f_c t)\sin\phi] \quad (11)$$

Let, $$I_{in} = x(t) \cdot \cos(2\pi f_c t)$$

$$Q_{in} = -x(t) \cdot \sin(2\pi f_c t) \quad (12)$$

From equations (4), (11), and (12), the following is known:

$$I_{out} = I_{in}$$

$$Q_{out} = -I_{in}\sin\phi + Q_{in}\cos\phi \quad (13)$$

For small $\phi$, $\sin\phi \approx \phi$, $\cos\phi \approx 1$, and a term $Q_{in} \cdot \phi$ is added on the first row of equation (13), and the following is obtained:

$$I_{out} = I_{in} + Q_{in} \cdot \phi$$

$$Q_{out} = -I_{in}\phi + Q_{in} \quad (14)$$

Equation (14) can be re-written as:

$$\begin{bmatrix} I_{out} \\ Q_{out} \end{bmatrix} = \begin{bmatrix} 1 & \varphi \\ -\varphi & 1 \end{bmatrix} \begin{bmatrix} I_{in} \\ Q_{in} \end{bmatrix} \quad (15)$$

It can be noticed that $\sin\phi \approx \phi$, $\cos\phi \approx 1$, thus equation (13) indicates a vector rotation operation. In other words, equation (14) shows a practical way to correct the phase imbalance offset. The purpose of control parameter PH_ADJ_TC (1-22) is to control the tracking speed of the phase imbalance estimation and correction loop. The larger the value, the slower the tracking speed but smaller the tracking error. The smaller the value, the faster the tracking speed but larger the tracking error.

Figure 5:
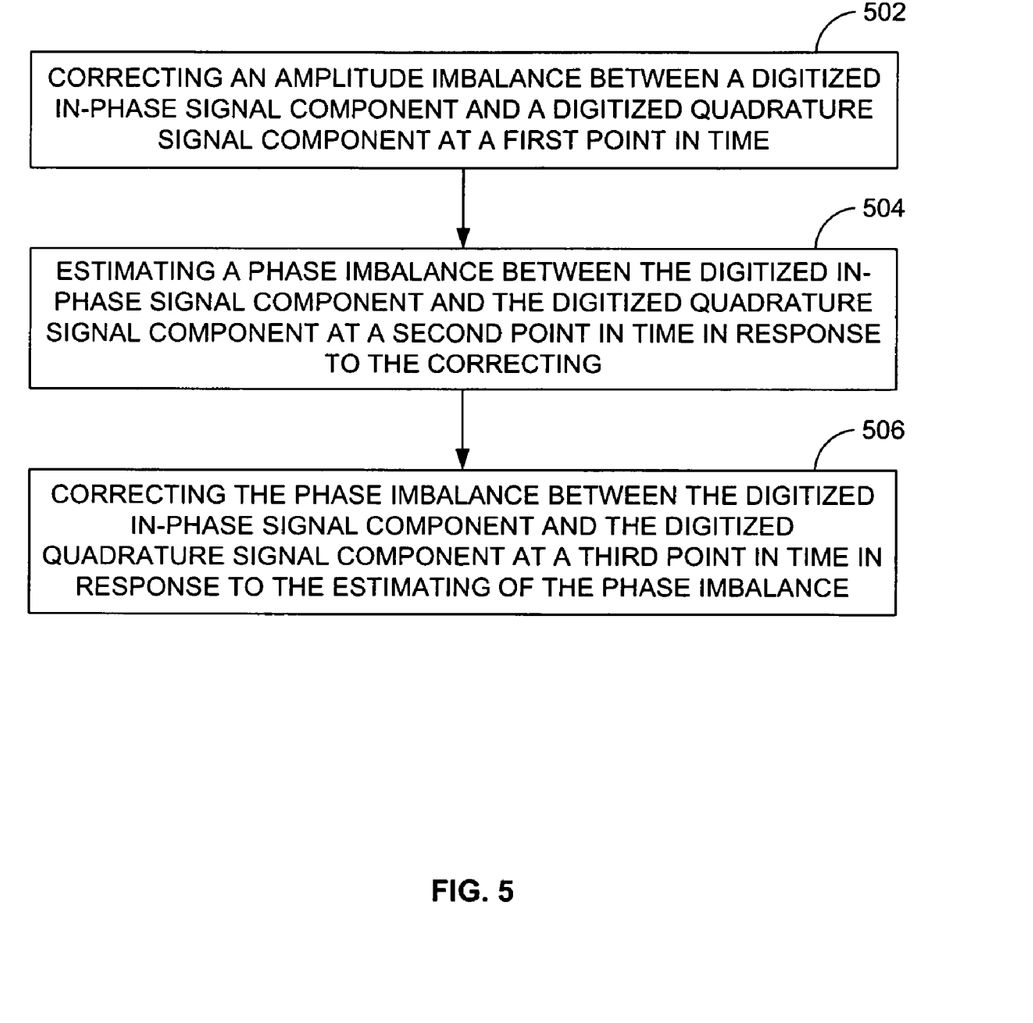
FIG. 5 is a flow diagram illustrating a method of processing an in-phase signal component and a quadrature signal component of a LIF signal according to an embodiment herein.

FIG. 5, with reference to FIGS. 3 and 4, is a flow diagram illustrating a method of processing an in-phase signal component (I) and a quadrature signal component (Q) of a LIF signal according to an embodiment herein, wherein the method comprises: correcting (502) an amplitude imbalance between a digitized in-phase signal component and a digitized quadrature signal component at a first point in time; estimating (504) a phase imbalance between the digitized in-phase signal component and the digitized quadrature signal component at a second point in time in response to the correcting, and correcting (506) the phase imbalance between the digitized in-phase signal component and the digitized quadrature signal component at a third point in time in response to the estimating of the phase imbalance.

In step (502), an amplitude imbalance is corrected between a digitized in-phase signal component and a digitized quadrature signal component at a first point in time. In step (504), a phase imbalance is estimated between the digitized in-phase signal component and the digitized quadrature signal component at a second point in time in response to the correcting. In step (506), the phase imbalance is corrected between the digitized in-phase signal component and the digitized quadrature signal component at a third point in time in response to the estimating of the phase imbalance.

The amplitude imbalance is determined as a function of at least one of a variance of the in-phase signal component and a variance of the quadrature signal component. The amplitude imbalance is determined in accordance with equation:

$$\alpha = \sqrt{\frac{\text{Var}(y_I)}{\text{Var}(y_Q)}} - 1,$$

$\alpha$ denotes the amplitude imbalance, Var denotes variance, $y_I$ denotes the in-phase component of a complex IF signal output, and $y_Q$ denotes the quadrature component of the complex IF signal output. The phase imbalance is determined as a function of at least one of an expected value of the digitized in-phase signal component at the second point in time, an expected value of the digitized quadrature signal component at the second point in time, and an expected value of an input signal at the second point in time. The phase imbalance is estimated in accordance with equation:

$$\varphi = -\frac{2E(y_I \cdot y_Q)}{E(x^2(t))},$$

$\varphi$ denotes a phase imbalance, E denotes the expectation function, $y_I$ denotes the in-phase component of a complex IF signal output, and $y_Q$ denotes the quadrature component of the complex IF signal output.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
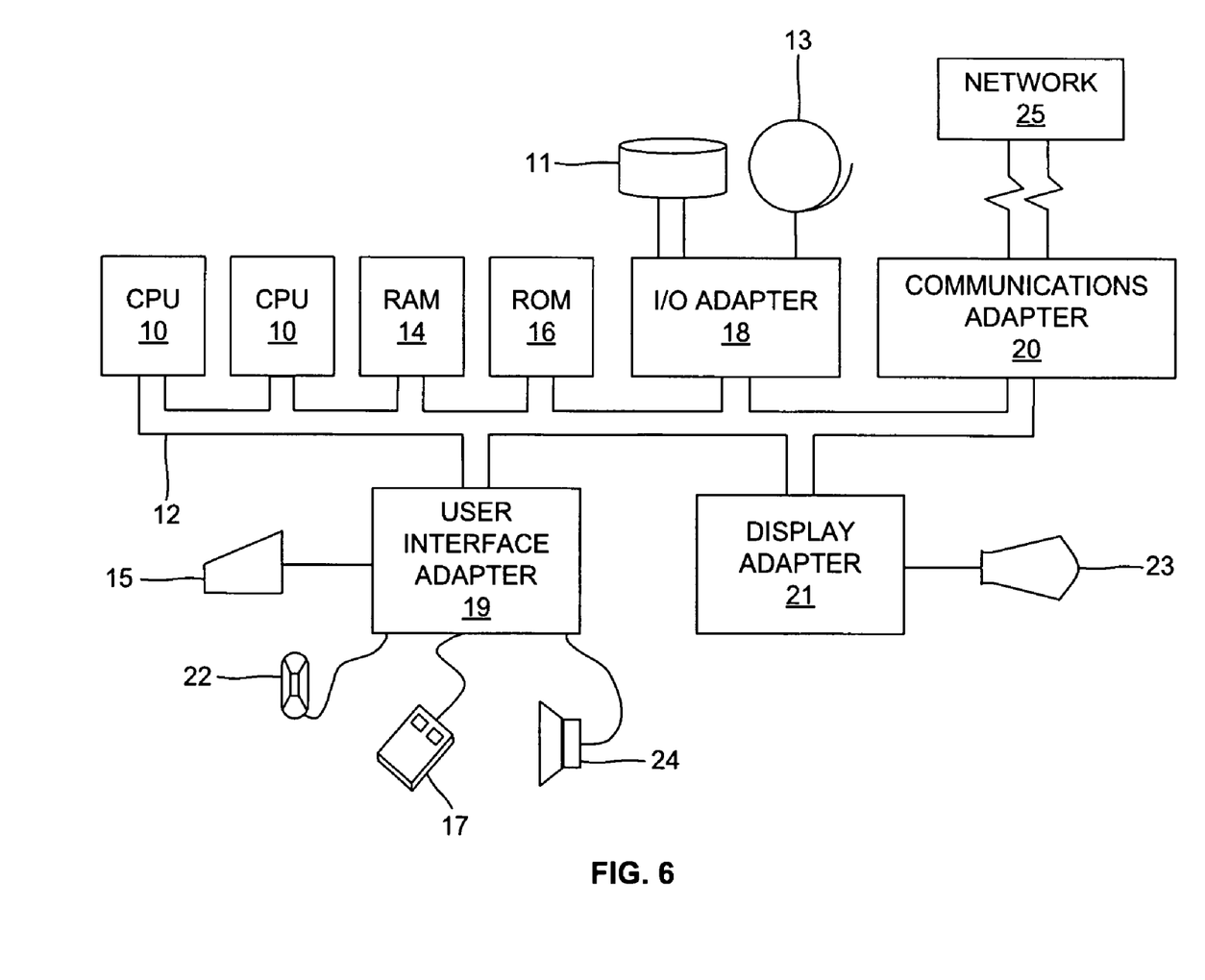
FIG. 6 illustrates a schematic diagram of a computer architecture used in accordance with the embodiments herein.

A representative hardware environment for practicing the embodiments herein is depicted in FIG. 6. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The embodiments herein provide an approach to achieve IR correction with superior performance (>50 dB rejection ratio). The embodiments herein make use of the statistical properties of the in-phase (I) and the quadrature (Q) components. The amplitude and the phase imbalance offsets are first estimated and then corrected using a feedback loop. Further, the estimation and the correction logic are realized entirely in the digital domain and VLSI architectures 300, 400.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of processing an in-phase signal component and a quadrature signal component of a low intermediate frequency (LIF) signal, said method comprising:
   estimating and correcting an amplitude imbalance between a digitized in-phase signal component and a digitized quadrature signal component at a first point in time, wherein said digitized in-phase signal component corresponds to said in-phase signal component at said first point in time and said digitized quadrature signal component corresponds to said quadrature signal component at said first point in time; and
   estimating and correcting a phase imbalance between said digitized in-phase signal component and said digitized quadrature signal component at a second point in time in response to the correcting process, wherein said second point in time is subsequent to said first point in time,
   wherein the correcting of said amplitude imbalance comprises determining an amplitude offset between said digitized in-phase signal component at said first point in time and said digitized quadrature signal component at said first point in time.

2. The method of claim 1, wherein said amplitude imbalance is determined as a function of at least one of a variance of said in-phase signal component and a variance of said quadrature signal component.

3. The method of claim 2, wherein said amplitude imbalance is determined in accordance with equation:

$$\alpha = \sqrt{\frac{\text{Var}(y_I)}{\text{Var}(y_Q)}} - 1,$$

wherein $\alpha$ denotes said amplitude imbalance, Var denotes variance, $y_I$ denotes the in-phase component of a complex intermediate frequency (IF) signal output, and $y_Q$ denotes the quadrature component of said complex IF signal output.

4. A method of processing an in-phase signal component and a quadrature signal component of a low intermediate frequency (LIF) signal, said method comprising:
   estimating and correcting an amplitude imbalance between a digitized in-phase signal component and a digitized quadrature signal component at a first point in time, wherein said digitized in-phase signal component corresponds to said in-phase signal component at said first point in time and said digitized quadrature signal component corresponds to said quadrature signal component at said first point in time; and
   estimating and correcting a phase imbalance between said digitized in-phase signal component and said digitized quadrature signal component at a second point in time in response to the correcting process, wherein said second point in time is subsequent to said first point in time,
   wherein a phase offset is determined as a function of at least one of an expected value of the digitized in-phase signal component at said second point in time, an expected value of the digitized quadrature signal component at said second point in time, and an expected value of an input signal at said second point in time.

5. The method of claim 4, wherein the phase offset is determined in accordance with equation:

$$\varphi = -\frac{2E(y_I \cdot y_Q)}{E(x^2(t))},$$

wherein $\phi$ denotes a phase imbalance, E denotes the expectation function, $y_I$ denotes the in-phase component of a complex intermediate frequency (IF) signal output, and $y_Q$ denotes the quadrature component of said complex IF signal output.

6. A method of processing an in-phase signal component and a quadrature signal component of a low intermediate frequency (LIF) signal, said method comprising:
   estimating and correcting an amplitude imbalance between a digitized in-phase signal component and a digitized quadrature signal component at a first point in time, wherein said digitized in-phase signal component corresponds to said in-phase signal component at said first point in time and said digitized quadrature signal component corresponds to said quadrature signal component at said first point in time;
   estimating and correcting a phase imbalance between said digitized in-phase signal component and said digitized quadrature signal component at a second point in time in response to the correcting process, wherein said second point in time is subsequent to said first point in time;
   correcting a phase offset between the digitized in-phase signal component and the digitized quadrature signal component at a third point in time in response to the estimating said phase offset, wherein said third point in time is subsequent to said second point in time.

7. A method of processing an in-phase signal component and a quadrature signal component of a low intermediate frequency (LIF) signal, said method comprising:
correcting an amplitude imbalance between a digitized in-phase signal component and a digitized quadrature signal component at a first point in time, wherein said digitized in-phase signal component corresponds to said in-phase signal component at said first point in time and said digitized quadrature signal component corresponds to said quadrature signal component at said first point in time, wherein the correcting of said amplitude imbalance comprises calculating said amplitude offset between said digitized in-phase signal component at said first point in time and said digitized quadrature signal component at said first point in time;
estimating a phase imbalance between said digitized in-phase signal component and said digitized quadrature signal component at a second point in time in response to said correcting, wherein said second point in time is subsequent to said first point in time; and
correcting said phase imbalance between said digitized in-phase signal component and said digitized quadrature signal component at a third point in time in response to the estimating of said phase imbalance, wherein said third point in time is subsequent to said second point in time.

8. The method of claim 7, wherein said amplitude imbalance is determined as a function of at least one of a variance of said in-phase signal component and a variance of said quadrature signal component.

9. The method of claim 8, wherein said amplitude imbalance is determined in accordance with equation:

$$\alpha = \sqrt{\frac{\text{Var}(y_I)}{\text{Var}(y_Q)}} - 1,$$

wherein $\alpha$ denotes said amplitude imbalance, Var denotes variance, $y_I$ denotes the in-phase component of a complex intermediate frequency (IF) signal output, and $y_Q$ denotes the quadrature component of said complex IF signal output.

10. The method of claim 7, wherein said phase imbalance is determined as a function of at least one of an expected value of the digitized in-phase signal component at said second point in time, an expected value of the digitized quadrature signal component at said second point in time, and an expected value of an input signal at said second point in time.

11. The method of claim 10, wherein said phase imbalance is estimated in accordance with equation:

$$\varphi = -\frac{2E(y_I \cdot y_Q)}{E(x^2(t))},$$

wherein $\phi$ denotes a phase imbalance, E denotes the expectation function, $y_I$ denotes the in-phase component of a complex intermediate frequency (IF) signal output, and $y_Q$ denotes the quadrature component of said complex IF signal output.

12. A circuit comprising:
an IQ mixer configured to provide a signal comprising in-phase (I) and quadrature (Q) components, wherein said in-phase and quadrature components comprise at least one of an input and an output signal;
a plurality of cycle counters operatively connected to said IQ mixer;
at least one loop gain unit operatively connected to said plurality of cycle counters, said loop gain unit comprising at least one predefined threshold; and
at least one round/clip component operatively connected to said at least one loop gain unit and adapted to remove an undesired signal and to correct a digitized in-phase signal component and a digitized quadrature signal component of said signal at a first point in time, wherein said digitized in-phase signal component corresponds to said in-phase signal component at said first point in time and said digitized quadrature signal component corresponds to said quadrature signal component at said first point in time, and a phase imbalance between said digitized in-phase signal component and said digitized quadrature signal component at a second point in time in response to said correct digitized in-phase signal component and a digitized quadrature signal component of said signal, wherein said second point in time is subsequent to said first point in time.

13. The circuit of claim 12, wherein said plurality of cycle counters are adapted to determine the number of times said signal has a phase imbalance and an amplitude imbalance.

14. The circuit of claim 12, wherein said predefined threshold is at least one of a 1 and 0.

15. The circuit of claim 14, wherein said amplitude imbalance is determined in accordance with equation:

$$\alpha = \sqrt{\frac{\text{Var}(y_I)}{\text{Var}(y_Q)}} - 1,$$

wherein $\alpha$ denotes said amplitude imbalance, Var denotes variance, $y_I$ denotes the in-phase component of a complex intermediate frequency (IF) signal output, and $y_Q$ denotes the quadrature component of said complex IF signal output.

16. The circuit of claim 12, wherein an amplitude imbalance is determined as a function of at least one of a variance of said in-phase signal component and a variance of said quadrature signal component.

17. The circuit of claim 12, wherein said IQ mixer is adapted to mix said in phase and said quadrature components.

18. The circuit of claim 12, wherein said phase imbalance is corrected based on a phase imbalance offset estimation.

19. The circuit of claim 12, wherein a phase offset is determined as a function of at least one of an expected value of the digitized in-phase signal component at said second point in time, an expected value of the digitized quadrature signal component at said second point in time, and an expected value of an input signal at said second point in time.

20. The circuit of claim 19, wherein said phase imbalance is estimated in accordance with equation:

$$\varphi = -\frac{2E(y_I \cdot y_Q)}{E(x^2(t))},$$

wherein $\phi$ denotes a phase imbalance, E denotes the expectation function, $y_I$ denotes the in-phase component of a complex intermediate frequency (IF) signal output, and $y_Q$ denotes the quadrature component of said complex IF signal output.

* * * * *